April 21, 1970     I. H. CULVER     3,508,020

LINEARIZATION OF NEGATIVE SPRING RATE SYSTEMS

Filed March 18, 1968     2 Sheets-Sheet 1

INVENTOR.
IRVEN H. CULVER
BY
*Christie, Parker & Hale*
ATTORNEYS.

INVENTOR.
IRVEN H. CULVER
BY
ATTORNEYS.

United States Patent Office 3,508,020
Patented Apr. 21, 1970

3,508,020
LINEARIZATION OF NEGATIVE SPRING RATE SYSTEMS
Irven H. Culver, Playa Del Rey, Calif., assignor to Southwestern Industries, Inc., Los Angeles, Calif., a corporation of California
Filed Mar. 18, 1968, Ser. No. 713,957
Int. Cl. H01h *35/40;* B21d *7/06*
U.S. Cl. 200—83        12 Claims

ABSTRACT OF THE DISCLOSURE

In an actuator device in which a movable actuator member is biased by a non-linear negative spring rate mechanism, the negative aspect of the spring rate being of principal importance, a secondary biasing mechanism having a positive spring rate sufficient, when added to the spring rate of the negative rate biasing mechanism, to produce a net negative spring rate which is substantially linear through the operating range of the actuator member.

BACKGROUND OF THE INVENTION

Field of the invention

This invention relates to actuator devices and, more particularly, to apparatus for linearizing the spring rate of a biasing system for the actuator member, which biasing system otherwise has a non-linear negative spring rate.

Review of the prior art

In modern missiles, many fluid circuits such as liquid oxygen systems and the like are controlled by pressure sensitive devices which sense fluid pressure in a particular location or line of the system, and actuate switches, valves or solenoids to control fluid flow or fluid pressure at the same or other locations in the same or different systems, or to initiate a desired control function in an electrical system, for example.

These pressure sensitive control devices often are subjected to extreme operating conditions. For example, a device used in a rocket may be required to function throughout a temperature range extending from −350° F. to +350° F., and to withstand shock and vibration loadings of up to 100 G's or more in magnitude. Moreover, such devices often must be responsive to relatively minute pressure differentials.

A control device in use today relies upon a bistable actuator which controls the operation of an electrical switch. The actuator includes a diaphragm to which is mounted a stem which reciprocates in response to movement of the diaphragm. Fluid pressure to be monitored is applied to the diaphragm. Once the pressure of fluid presented to the diaphragm reaches a predetermined high value $P_1$, the stem is reciprocated against a resilient biasing mechanism from one to the other of its two limits of travel to actuate the switch from one to the other of two conditions of the switch. If pressure applied to the diaphragm drops to a predetermined lower level $P_2$, the diaphragm and the stem return to their initial position and the switch is operated back to its original state.

In view of the environment in which the control device must function, it is desired that the actuator mechanism operate with a toggle-like action in shifting from one stable state to the other stable state as fluid pressures vary above or below the permitted pressure range programmed into the control device. In order to assure that the actuator mechanism operates with a toggle-like action, the biasing mechanism against which the stem is driven has a negative spring rate.

It should be understood at this point that the spring rate of a resilient system is the first derivative of the force versus deflection curve of the system, such a curve being obtained by plotting the force applied to the system vertically on Cartesian (X, Y) coordinates, and by plotting the deflection of the system produced by such force horizontally on such coordinates. If this derivative has a negative value, corresponding to a negative slope of the curve, then the spring rate of the mechanism is said to be negative. A negative spring rate indicates that as the spring is deflected positively, the load resulting from (or productive of) such deflection is decreased in magnitude. Coil springs, for example, show positive spring rates in that greater and greater deflections of the spring result in more and more force being developed by the spring.

Because of the geometry of the biasing mechanism used in the above-mentioned existing device, the biasing mechanism against which the stem is driven in responding to pressure levels above $P_1$ has a non-linear spring rate. Such non-linearity in the spring rate of the biasing mechanism has undesirable effects on the operation of the switch. The rate of change of the biasing force applied to the stem is less in one of the two stable positions of the stem than in the other. Therefore, the stem, instead of moving instantaneously between its two stable states, may tend to creep from the position having associated with it the least rate of change of the biasing force. The spring rate non-linearity also causes the switch to have different operating characteristics when actuated in opposing directions.

It is desired that the switch have operating characteristics which are the same in opposite directions. Typically, the switch contacts are preloaded against each other so that "make" or "break" between the contacts occurs substantially instantaneously, assuming that the stem of the actuator mechanism snaps from one of its stable states to the other. The contacts are preloaded relative to each other so that they remain engaged under high shock or vibrational forces and do not chatter in such an environment. However, if the stem of the actuator device creeps through the initial phases of its motion between its two stable positions, the preloading force existing between "made" contacts changes and can fall to zero before "break" occurs. If the control device, including the switch, is subjected to severe vibrations during creep of the stem, the switch contacts will most probably chatter. Similarly, contact chatter can occur on the "make" cycle of the switch if the stem creeps into a switch ON position from its switch OFF position.

In view of the foregoing problems associated with the non-linearity of the biasing mechanism coupled to the stem in the above-mentioned existing device, it was necessary to operate the device in that portion of the force versus deflection curve which is essentially linear, and which also has a high negative slope, i.e., high negative spring rate. In this range, a relatively small deflection of the stem corresponds to large differences in force exerted by the biasing mechanism, a situation which is acceptable so long as $P_1$ and $P_2$, defining the pressure range to be monitored, are significantly different in value. Modern systems, however, require the monitoring of pressures within a narrow pressure range. This means that the biasing mechanism, because a finite amount of displacement of the stem is required to properly operate the switch, must be operated in a highly non-linear area where the required deflection corresponds to a smaller difference in force applied to the stem. In view of the foregoing, however, this expedient increases the tendency of the stem to creep in one direction or the other and increases the likelihood that the switch contacts will chatter if the device is operated under conditions of vibration or acceleration.

Prior attempts to eliminate the non-linearity of the force applied by the biasing mechanism to the stem were not successful. Where the switch was highly sensitive, of a small physical size, and subjected to extreme operating conditions, prior attempts were impractical because they employed complicated and relatively large mechanical devices which were prone to fail under high shock conditions or extremely low temperatures. An increase in the physical size and weight of the device is highly undesirable since increased weight renders the mechanism more sensitive to acceleration and vibration. Also, prior attempts at eliminating spring rate non-linearity often significantly reduce the effective magnitude of the biasing force itself, in turn requiring an increase in the size and weight of the structure of the biasing mechanism itself.

SUMMARY OF THE INVENTION

This invention provides simple, efficient, effective and lightweight apparatus for linearizing the normally non-linear negative spring rate of the biasing mechanism of the above-described pressure monitoring switch, for example. The light weight of present apparatus does not render the device significantly more sensitive to acceleration and vibration and enables the practical and economic monitoring of pressures within previously unattainable narrow ranges. Because the spring rate of the resulting device is essentially linear, the device operates the same in either direction. Also, the desired snap or toggle action of the device is not impaired, with the result that electrical contacts do not chatter or bounce as the device is operated.

It will be understood, however. that the present invention has applications in devices other than in the above-mentioned pressure monitoring switch. The invention has utility in the broader field of mechanical and electromechanical actuators.

Generally speaking, one aspect of this invention resides in an actuator which includes a movable member which is movable from one to the other of two spaced limits of travel when an actuating stimulus of first selected magnitude is applied to it. Means having a non-linear negative spring rate through deflections corresponding to the travel of the movable member is provided and has a selected stiffness; such means are provided for biasing the movable member from the other to the one limit of travel in the absence of an actuating stimulus of value greater than a second lesser selected magnitude applied to the movable member. In moving to the other limit of travel, the movable member must act against these biasing means. The actuator also includes a housing for the movable member and the negative rate biasing means. In this environment, the invention includes secondary biasing means coupled between the housing and the movable member for biasing the movable member from the other to the one limit of travel thereof. The secondary biasing means has a stiffness which is substantially less than the selected stiffness of the actuator biasing means. The secondary biasing means has a positive non-linear spring rate of character through deflections corresponding to the travel of the movable member sufficient, when added to that of the negative rate biasing means, to produce a substantially linear negative composite spring rate.

DESCRIPTION OF THE DRAWINGS

The above-mentioned and other features of the invention are more fully set forth in the following detailed description of a presently preferred embodiment of the invention, which description is presented with reference to the accompanying drawings, wherein.

DESCRIPTION OF A PREFERRED EMBODIMENT

Figure 1:
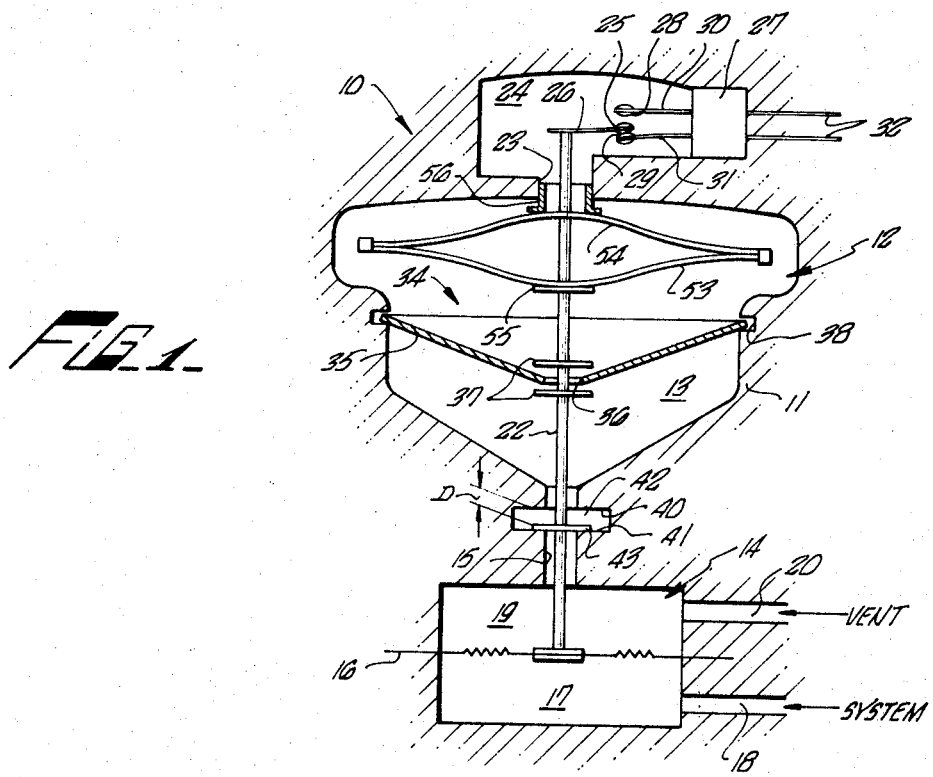
FIG. 1 is a simplified cross-sectional elevation view of a pressure monitoring device incorporating the present invention.

A diaphragm pressure switch 10, shown in simplified form in FIG. 1 as an example of an actuator in which the invention has utility, includes a housing 11 defining an internal chamber 12 having an upper part 13 and a lower part 14 connected by a neck portion 15. A diaphragm 16 is disposed across chamber part 14 and has its periphery clamped to the housing. The diaphragm divides chamber part 14 into a system chamber 17, to which fluid from a monitored fluid system is applied at system pressure through a port 18, and into a vent chamber 19 which is communicated by a port 20 to ambient pressure conditions. The fluid pressure supplied to system chamber 17 may be the pressure existing at a selected point in a liquid oxygen system in a liquid fueled rocket for example.

An operating stem 22 is connected at its lower end to the center of the diaphragm and extends through neck 14 into chamber 13. The upper end of the stem extends through a passage 23 which interconnects chamber 13 with a switch chamber 24. In the switch chamber, the stem carries an electrical switch contact pad 25 at the free end of a resilient arm 26 which extends in cantilever fashion laterally from the stem. Contact pad 25 is electrically insulated from the stem and is connected by a conductor (not shown) into an electrical circuit controlled by the operation of an electrical switch 27 disposed in chamber 24. Contact pad 25 cooperates alternately, depending upon the operative state of the stem, between a pair of contact pads 28 and 29 mounted to the ends of a corresponding pair of resilient support arms 30 and 31, the arms being conductive and connected into the controlled circuit by conductors 32.

Within chamber 13 the stem is coupled to a negative spring rate biasing mechanism 34. As shown in FIG. 1, this mechanism may include a Belleville spring 35 disposed concentric to the stem and having its inner rim 36 confined loosely between a pair of keeper collars 37 secured to the stem on opposite sides of the Belleville spring. The outer periphery of the Belleville spring is disposed above the inner rim along the stem and is engaged in a recess 38 formed circumferentially of chamber 13. The Belleville spring is preloaded so that, throughout the range of reciprocal travel permitted to the stem along its length, the spring operates within that portion of its force/deflection curve having a negative slope; if a curve plotted on Cartesian coordinates has a negative slope over a given portion thereof, the first derivative of the relation represented by the curve has a negative value throughout the same range. That is, spring 35 has a negative spring rate in terms of upward travel of the stem and of loads imposed upwardly upon the spring by the stem.

Stem 22 is confined to reciprocatory motion between limits which are defined by opposite stop surfaces 40 and 41 of a recess 42 formed in the housing about the stem along neck 15. The stop surfaces cooperate with a stop collar 43 secured to the stem. The effective displacement D afforded to the stem by the stop surfaces and the stop collar corresponds to the deflection range referred to in the subsequent description of device 10.

From the description presented thus far, it is apparent that device 10 is a bistable mecahnism responsive to pressure presented to system chamber 17 via port 18. Assume that the device is in the state shown in FIG. 1 with stop collar 43 engaged with lower stop surface 41. Any increase in pressure of fluid applied to the system chamber above a selected pressure $P_1$ will cause the stem to snap upwardly until the stop collar engages stop surface 40, thereby causing switch contact 25 to move from engagement with contact 29 into engagement with contact 28. Thereafter, the pressure in the system chamber must fall to a lower selected pressure $P_2$ to cause the stem to move back to its original state. The stem will not move upwardly against the bias of spring 35 until the pressure in the system chamber again rises above $P_1$. Thus, device 10 responds to excursions of system pressure outside the pressure range defined between $P_1$ and $P_2$ to generate electrical signals used by structure (not shown) to perform desired control functions.

Relative to Belleville spring 35, upward movement of stem 22 is regarded as movement in a positive direction. The negative spring rate of the Belleville spring gives the desired toggle action to the movement of the stem, which toggle action assures that the stem is one or the other of its two stable positions depending upon the pressure present in system chamber 17.

Figure 2:
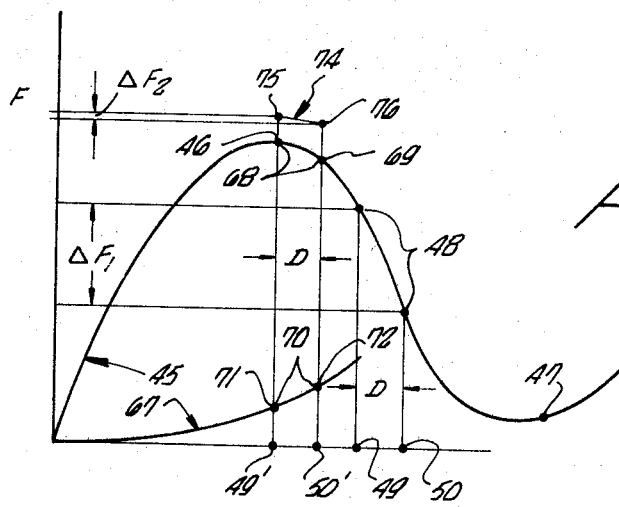
FIG. 2 is a graphical representation of the characteristics of the springs involved in this invention.

Referring to FIG. 2, curve 45 is the graphical representation of the force/deflection characteristic of spring 35, the displacement of spring inner rim 36 upwardly being plotted horizontally (this quantity corresponds to upward movement of stem 22) and the force required to produce such deflection of the spring inner rim being plotted vertically (such force corresponds to the force applied downwardly upon the stem by the spring). Curve 45 has a maximum at 46 and a minimum at 47 between which the slope of the curve is negative to indicate that through such a deflection range the spring manifests a negative spring rate. As noted above, in device 10 spring 35 is preloaded to operate in its range of negative spring rate through a deflection range corresponding to displacement of the stem through a distance D.

As illustrated in FIG. 1, resilient support arms 30 and 31 for switch contacts 28 and 29 are spaced sufficiently close that the distance between contacts 28 and 29, with no load applied to the support arms, is less than distance D, the permitted reciprocal travel of the stem. Thus, when the stem is in either of its stable positions, contact arm 26 and the arm supporting the contact with which contact 25 is engaged are deflected so that the engaged contacts are forcibly engaged with each other to resist separation by vibrations or shocks applied to housing 11. Because of this feature of the electrical switch in device 10, it is apparent that a particular travel of the stem is required to produce a device which will withstand vibrations and shocks of a defined magnitude without generating spurious signals through conductors 32. If this distance of travel is reduced, the ability of the device to withstand vibration and shock is also reduced. Therefore, parameter D described above is essentially a fixed parameter in any device of the type described capable of meeting specified environmental conditions.

The problems of stem creep and contact bounce were reviewed above. These problems are minimized where, according to the prior art, device 10 is constructed so that the portion of curve 45 corresponding to stem travel through distance D is linear or essentially linear; such a portion of curve 45 is indicated in FIG. 2 by range 48 corresponding to spring deflection limits 49 and 50 and to a force difference of $\Delta F_1$ applied to stem 22. Recalling that distance D is essentially fixed for a particular class of device 10, it is apparent that use of spring 35 through range 48 of curve 45 necessarily means that the device must be used to monitor a rather broad pressure range, the force applied to the stem at deflection condition 49 being attributable to pressure $P_1$ and the force applied to the stem at deflection condition 50 being attributable to pressure $P_2$. If the device is to be operated in connection with a pressure range productive of a force differential applied to the stem of less than $\Delta F_1$, the variation indicated by the prior art was to shift deflection range D laterally along curve 45, say to the left to be between spring deflection conditions 49' and 50' as shown in FIG. 2, thereby reducing the force differential associated with deflection range D and also significantly and undesirably subjecting the operation of the device to the disadvantages of a non-linear negative rate biasing mechanism. The use of a range of curve 45 which bracketed maximum 46 was decidedly not preferred because such expedient sacrificed the desired toggle action of the mechanism and produced a device which tended to "hunt" in response to changes in pressure applied to diaphragm 16.

This invention enables the use of that portion of curve 45 which lies between deflection conditions 49' and 50' without encountering the problems associated with a non-linear spring rate in the negative rate biasing mechanism.

Figure 3:
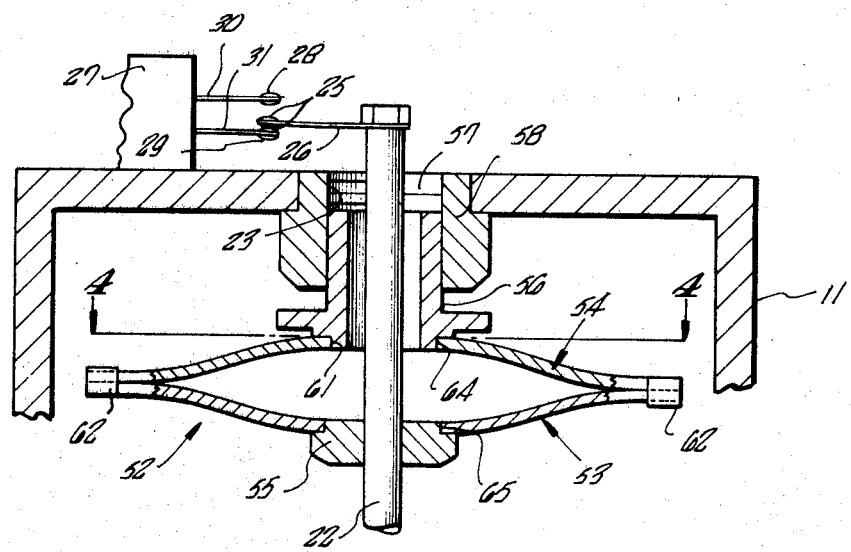
FIG. 3 is an enlarged cross-sectional elevation view of the invention.
Figure 4:
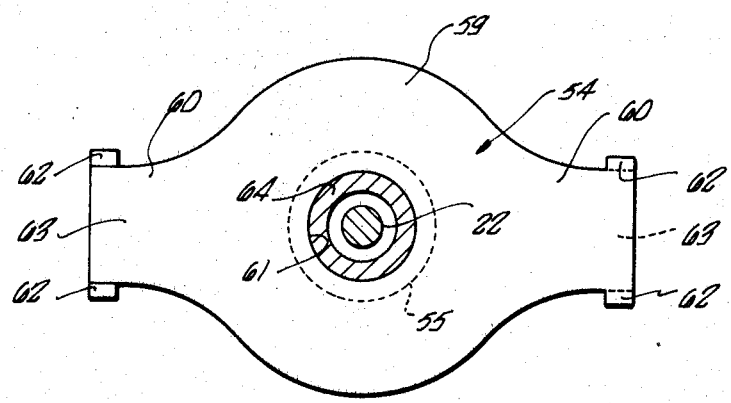
FIG. 4 is a view taken along line 4—4 in FIG. 3.

As shown in FIGS. 1, 3 and 4, stem 22 is coupled to a secondary biasing mechanism 52 between primary biasing mecahnism 34 and passage 23 from chamber 13 to switch chamber 24. The secondary biasing mechanism includes a pair of identical leaf spring elements 53 and 54, a collar 55 secured to the stem for movement with the stem, and an externally threaded, axially bored collar 56 engaged with internal threads 57 formed along passage 23; the passage is shown to be defined by a bushing 58 secured to the housing. As shown best by FIGS. 3 and 4, each spring element 53, 54 has a uniform thickness along its length, an enlarged central portion 59 and end extension portions 60 which are aligned diametrically opposite each other relative to a hole 61 formed through the central portion. The ends of extensions 60 remote from hole 61 are narrower in width (FIG. 4) than the central portion from which the extensions extend and are smoothly faired from the central portion. The remote end of one extension of each leaf spring element defines a pair of lateral lugs 62 which extend in the same direction substantially normal to the spring element adjacent thereto and are spaced apart a distance greater than width of the extension at the other end 63 of the same element.

FIGS. 1 and 3 best illustrate the curvature of the leaf spring elements in a longitudinal plane normal to the lengths of the elements. In the relaxed state of each spring, the remote ends of each spring element are coplanar with each other, while the central portion of the element is parallel to the spring ends but is displaced out of the common plane of the ends in a direction opposite to that in which lugs 62 extend from the same spring element. Between the midlength of each element and the opposite ends thereof, each spring element, as viewed in FIGS. 1 and 3, defines a gentle S curvature in that the surface of the element opening toward lugs 62 is curved, proceeding from hole 61 to the opposite ends of the element, first concave and then convex.

The lower end of collar 56 defines an annular projection 64, the outer diameter of which is sized to register intimately with hole 61 in spring element 54. The upper surface of collar 55 defines a similar projection 65 which registers intimately with the central hole of spring element 53.

The spring elements are engaged with their respective projections 64 and 65 and are disposed so that their ends engage each other with the central portions of the elements spaced apart along the stem. Unlugged end 63 of spring element 53 is disposed between the lugs of element 54, and vice versa regarding element 54 and the lugs of element 53. The lugs assure that the spring elements are aligned substantially parallel with each other during operation of device 10.

Since spring elements 53 and 54 are engaged with each other at or adjacent their ends and their centers are engaged either with housing 11 or with stem collar 55, each half-length of each spring element deflects as a cantilever beam, loaded at its unsupported end, during travel of the stem through distance D. The spring rate K of a cantilever beam loaded at its unsupported end is given by the relation $K=3EI/L^3$ where E is the value of Young's modulus for the beam material, I is the moment of inertia of the cross-sectional area of the beam, and L is the length of the beam from its supported end to the point of application of a deflecting load applied at the unsupported end of the beam. The value of the moment of inertia of a rectangular area, taken about an axis midway between and parallel to the long side of the rectangle, is given by the relation $I = t^3 w/12$ where, in terms of spring elements 53 and 54, $t$ is the thickness of the element and $w$ is its effective width. Substituting terms, it is seen that the stiffness of spring elements 53 and 54, for any given position of stem 22, is given by the relation $K = E \cdot t^3 \cdot w/4L^3$.

An examination of FIGS. 1 and 3 will show that, as stem 22 moves upwardly through distance D, the points of engagement between spring elements 53 and 54 move toward the stem as spring extensions 60 roll upon each other due to the curvature of the elements. Thus, the value of L in the last-given relation is a variable throughout deflection of the elements during operation of device 10, as is the value of $w$ due to the configuration of the elements as shown in FIG. 4. Therefore, as the spring elements are deflected by upward movement of the stem, the force applied by the pair of spring elements to the stem varies non-linearly in a manner illustrated by curve 67 in FIG. 2. By proper selection of the material, configuration and curvature of spring elements 53 and 54, the shape of curve 67 can be adjusted as desired.

In device 10, primary biasing mechanism 34 is preloaded to operate through range 68 defined between deflection conditions 49' and 50'; note that this operating range is that indicated by the prior art if one is willing to accept the problems of non-linear spring rates in return for a low force (pressure) differential required to move stem 22 through displacement D. Device 10 differs from prior devices of similar character by the inclusion of spring elements 53 and 54. Therefore, as the stem moves upwardly, forces defined by range 68 on curve 45 between limits 46 and 69 (corresponding to deflection conditions 49' and 50') are applied to the stem in combination with those forces defined by range 70 of curve 67 between limits 71 and 72. Not only are the forces associated with curves 45 and 67 additive, the spring rates associated with these curves are also additive. The result of the addition of curves 45 and 67 through deflection ranges between stem deflection conditions 49' and 50' is illustrated by curve 74 in FIG. 2.

Curve 74 extends between limits 75 and 76 which correspond to stem deflection conditions 49' and 50', respectively. Between limits 75 and 76, curve 74 is essentially linear and has a negative slope which means that the spring rate of the combination of biasing mechanisms 34 and 52 is negative throughout stem displacement range D. It will also be noted from FIG. 2 that the difference between the forces associated with limits 75 and 76, $\Delta F_2$, is less than the difference between limits 46 and 69 of range 68 on curve 45. This means that the ability of device 10 to respond to slight pressure differentials applied to diaphragm 16 is greater than if the spring performance characteristic of the device were according to range 68 of curve 45 as indicated by the prior art. The use of this invention in devices like device 10 enables the production of a pressure switch capable of monitoring a pressure range which is as little as 2% of the pressure required to actuate the switch.

It is preferred that spring elements 53 and 54 have the least stiffness possible relative to the stiffness of biasing mechanism 34. When this desideratum is obtained, the magnitude of the force required to produce actuation of device 10 is defined primarily by primary biasing mechanism 34. An alternative to the use of a low stiffness secondary biasing mechanism would be the use of primary biasing mechanism 34 in its linear range to obtain a negative spring rate, and to use a large positive rate spring to obtain the desired actuation force characteristics. This expedient, however, means that the positive rate spring must be soft, i.e., large and heavy. This is an impractical alternative in terms of a pressure monitoring switch for use on missiles.

The linearity of curve 74 assures that electrical switch 27 has essentially identical operating characteristics for opposite directions of movement of stem 22.

The threaded connection of collar 56 to bushing 58 enables precise adjustment of the preload condition of spring elements 53 and 54 for the lower limit of travel of the stem. The extent to which these elements are preloaded determines the location of range 70 on curve 67 relative to stem displacement conditions 49' and 50', and therefore determines which portion of curve 67 is to be added to which portion of curve 45 to define resultant curve 74. This adjustment feature also allows for small variations in the shape of curve 74 when such variations are desired.

The use of two leaf springs 53 and 54 is preferred since such practice provides the desired spring characteristic with the least possible mass and friction. It will be apparent, however, that a single leaf spring in the position of spring 53 could be used, such spring bearing directly against the housing. Such a practice, however, produces sliding friction between the spring and the housing as the stem is displaced, thereby giving the movement of the overall device a "sticky" aspect. Also, it will be appreciated that a single, rather than double cantilever spring can be used bearing against the housing if lateral loads upon the stem are tolerable.

From the foregoing description, it is apparent that this invention provides an actuator mechanism which effectively, efficiently and economically solves the problems described above when used in a pressure sensitive switch for monitoring excursions of monitored pressure outside a selected pressure range. The invention can also be used in other applications where negative spring rate actuators having good linearity and low actuating force differentials are desired.

While the invention has been described with respect to specific structures and geometrical relationships, this description has been presented merely by way of example in furtherance of an explanation of a presently-preferred embodiment of the invention. Variations in the foregoing structure within the talents of one of ordinary skill in the art have been noted, and it will be understood that other variations in the described structure may also be practiced without departing from the scope and spirit of the invention. Accordingly, the foregoing description should not be regarded as limiting the scope of the invention.

What is claimed is:

1. In an actuator mechanism including a movable member operative upon movement thereof from one to the other of two spaced limits of travel in response to an actuating stimulus of first selected magnitude applied thereto, and primary biasing means coupled to the movable member and having a non-linear negative spring rate through deflections corresponding to the travel of the movable member and a selected stiffness for biasing the movable member from the other to the one of its limits of travel in the absence of an actuating stimulus of value greater than a second lesser selected magnitude applied to the movable member and against which the movable member must act in moving to said other limit of travel, the improvement in secondary biasing means coupled to the movable member for biasing the movable member from the other to the one limit of travel thereof, the secondary biasing means having a stiffness substantially less than the selected stiffness and a positive non-linear spring rate of character through deflections corresponding to the travel of the movable member sufficient, when added to that of the primary biasing means, to produce a substantially linear negative composite spring rate, the composite stiffness of the primary and secondary biasing means being substantially equal to that of the primary biasing means.

2. An actuator mechanism according to claim 1 wherein the movalbe member is reciprocable between said limits.

3. An actuator mechanism according to claim 2 including a housing for the movable member and the primary and secondary biasing means, and a diaphragm mounted in the housing and coupled to the movable member for reciprocating the movable member in response to deflection of the diaphragm by pressure differentials developed thereacross.

4. An actuator mechanism according to claim 1 including a housing for the movable member and the primary and secondary biasing means, the secondary biasing means being coupled between the housing and the movable member.

5. An actuator mechanism according to claim 4 wherein the secondary biasing means includes a leaf spring element coupled to the movable member and extending laterally of the direction of movement of the movable member to an end unsupported relative to the movable member, and means coupled between the end of the leaf spring and the housing and cooperatively configured with the leaf spring element so that the effective length of the leaf spring between the movable member and the coupling means decreases as the movable member moves from said other to said one limit of travel thereof.

6. An actuator mechanism according to claim 5 wherein the leaf spring element decreases in cross-sectional dimension normal to the direction of travel of the movable member proceeding along the element from the movable member to the end of the element.

7. An actuator mechanism according to claim 5 wherein the leaf spring element proceeding therealong from the movable member to the end of the element is curved concave and then convex to the direction in which the movable member travels in moving from said other to said one limit of travel.

8. An actuator mechanism according to claim 5 wherein the leaf spring element has an end remote from the aforementioned end thereof, the movable member being coupled to the leaf spring element substantially midway between said ends, and the cooperatively configured coupling means is coupled between the housing and the opposite ends of the leaf spring element.

9. An actuator mechanism according to claim 8 wherein the cooperatively configured coupling means includes a second leaf spring element similar to the one leaf spring element engaged between the housing and the ends of the one element, the leaf spring elements proceeding from the midlengths to the opposite ends thereof being curved first concave and then convex toward each other so that the spring elements roll on each other and the points of engagement therebetween move toward the midlengths thereof as the springs deflect in response to movement of the movable member from said other to said one limit of travel thereof.

10. An actuator mechanism according to claim 9 wherein the leaf spring elements are of uniform thickness and varying width proceeding from the midlengths to the opposite ends thereof.

11. An actuator mechanism according to claim 10 wherein the movable member is an elongated reciprocal member and passes through the leaf spring elements substantially at the midlengths of said elements.

12. In a pressure activated switch including a housing, a pressure responsive diaphragm mounted in the housing, a reciprocable stem connected at one end thereof to the diaphragm and movable from one to the other of two spaced limits of travel thereof in response to an actuating pressure of first selected magnitude applied to the diaphragm, primary biasing means coupled to the stem and having a non-linear negative spring rate through deflections corresponding to the travel of the stem and a selected stiffness for biasing the stem from the other to the one of its limits of travel in the absence of an actuating pressure greater than a second lesser selected magnitude applied to the diaphragm and against which the stem must act in moving to the other limit of travel, and a switch coupled to the stem for operation by the stem, the improvement in secondary biasing means coupled between the housing and the stem for biasing the stem from the other to the one limit of travel thereof, the secondary biasing means having a stiffness substantially less than the selected stiffness and a positive non-linear spring rate of character through deflections corresponding to the travel of the stem sufficient, when added to that of the primary biasing means, to produce a substantially linear negative composite spring rate, the composite stiffness of the primary and secondary biasing means being substantially equal to that of the primary biasing means, the secondary biasing means comprising a pair of similar elongate leaf spring elements through which the stem extends at substantially the midlengths thereof, the spring elements extending in opposite directions from the stem to unsupported ends, the spring elements having their ends engaged with each other when the stem is at its other limit of travel, the spring elements proceeding from the stem to the ends thereof being curved concave and then convex toward each other, means coupling one spring element to the stem and the other spring element to the housing adjacent the stem so that the midlengths of the elements move toward each other and the points of engagement of the elements with each other move toward the stem as the stem moves from its other to its one limit of travel, the spring elements varying in width between the ends and the midlengths thereof, and means for maintaining the spring elements in alignment with each other throughout deflection thereof in response to travel of the stem.

References Cited

UNITED STATES PATENTS

| | | | |
|---|---|---|---|
| 2,767,973 | 10/1956 | Ter Veen et al. | 267—161 |
| 2,883,485 | 4/1959 | Willard | 200—83 |
| 2,916,577 | 12/1959 | Smith | 200—83 |
| 2,945,629 | 7/1960 | Chute et al. | 267—161 XR |
| 3,107,766 | 10/1963 | Pritchard | 267—161 XR |
| 3,259,383 | 7/1966 | Johnson et al. | 267—161 |
| 3,442,180 | 5/1969 | Babic | 73—407 XR |

ROBERT K. SCHAEFER, Primary Examiner

J. R. SCOTT, Assistant Examiner

U.S. Cl. X.R.

73—407; 267—161